United States Patent
Bonn et al.

(10) Patent No.: US 6,326,593 B1
(45) Date of Patent: Dec. 4, 2001

(54) HEATING ELEMENT FOR A PART OF AN AUTOMOBILE WHICH IS HELD, ESPECIALLY THE STEERING WHEEL

(75) Inventors: Helmut Bonn, Haibach; Michael Germuth-Löffler, Aschaffenburg, both of (DE)

(73) Assignee: Takata-Petri AG (DE)

( * ) Notice: Subject to any disclaimer, the term of this patent is extended or adjusted under 35 U.S.C. 154(b) by 0 days.

(21) Appl. No.: 09/582,966
(22) PCT Filed: Feb. 1, 1999
(86) PCT No.: PCT/EP99/00641
 § 371 Date: Jul. 7, 2000
 § 102(e) Date: Jul. 7, 2000
(87) PCT Pub. No.: WO99/39964
 PCT Pub. Date: Aug. 12, 1999

(30) Foreign Application Priority Data

Feb. 4, 1998 (DE) .......................................... 298 02 578 U

(51) Int. Cl.[7] ........................................................ B60L 1/02
(52) U.S. Cl. .......................... 219/204; 219/529; 219/545; 219/549
(58) Field of Search ................................... 219/202, 204, 219/535, 528, 529, 545, 549, 553; 74/552, 557, 558

(56) References Cited

U.S. PATENT DOCUMENTS

| 1,168,146 | * | 1/1916 | Barnes | 219/204 |
|---|---|---|---|---|
| 1,385,527 | * | 7/1921 | Duer | 219/204 |
| 1,429,397 | * | 9/1922 | Barrow | 219/204 |
| 1,830,221 | * | 11/1931 | Blue | 219/204 |
| 4,535,221 | * | 8/1985 | Holsworth | 219/204 |
| 4,547,655 | * | 10/1985 | Kurata et al. | 219/204 |
| 4,549,069 | * | 10/1985 | Oge | 219/204 |
| 4,631,976 | * | 12/1986 | Noda et al. | 74/552 |
| 5,072,093 | * | 12/1991 | Scheuerer | 219/204 |
| 5,294,775 | * | 3/1994 | Carrier | 219/204 |
| 5,605,643 | * | 2/1997 | Reece | 219/204 |
| 5,847,360 | * | 12/1998 | Lorenzen et al. | 219/204 |
| 6,093,908 | * | 7/2000 | Haag | 219/204 |

FOREIGN PATENT DOCUMENTS

| 29 51 871 | 7/1981 | (DE) . |
|---|---|---|
| 31 39 410 | 4/1983 | (DE) . |
| 87 05 717.4 | 11/1987 | (DE) . |
| 38 37 743 | 5/1990 | (DE) . |
| 41 08 114 | 9/1992 | (DE) . |
| 42 39 068 | 5/1994 | (DE) . |
| 298 02 578 | 7/1998 | (DE) . |
| 0 437 641 | 7/1991 | (EP) . |
| 0 463 516 | 1/1992 | (EP) . |

* cited by examiner

*Primary Examiner*—Teresa Walberg
*Assistant Examiner*—Fadi H. Dahbour
(74) *Attorney, Agent, or Firm*—Foley & Lardner

(57) ABSTRACT

The invention relates to a heating element for a part of an automobile which is held, especially the steering wheel. The heating element consists of a textile support with at least one heating resistor. According to the invention, a knitted textile support is used.

11 Claims, 1 Drawing Sheet

HEATING ELEMENT FOR A PART OF AN AUTOMOBILE WHICH IS HELD, ESPECIALLY THE STEERING WHEEL

BACKGROUND OF THE INVENTION

The invention relates to a heating element for a graspable part of a motor vehicle, in particular for the steering wheel.

DE 29 51 871 A1 discloses a steering wheel cover, to the inner face of which is fastened a fabric lining, into which resistance wires are embedded. The fabric lining is provided with a masking, so that the resistance wires do not rest directly on the steering wheel rim.

This steering wheel cover with a heated fabric lining has the disadvantage that fabric is only slightly stretchable, so that the cover can be adapted only incompletely to the three-dimensional steering wheel rim. It is therefore scarcely possible to avoid creases.

SUMMARY OF THE INVENTION

The object on which the invention is based is to design the heating element in such a way that it can be adapted creaselessly to three-dimensional parts in the motor vehicle which are to be heated.

In a heating element for a graspable part of a motor vehicle, in particular for the steering wheel, the heating element consists of a textile support with at least one heating resistor. In an embodiment, a textile support knitted by stitch row or by single stitch is used. Such a support has high elasticity, so that it is adapted to three-dimensional parts without creases being formed.

In an embodiment for the steering wheel, the textile support is designed so that the textile support masks the steering wheel rim and the adjoining regions of the spokes. It is expedient to mask part of the spokes, because the driver, when operating the steering wheel, occasionally also grasps the region of the spokes which is contiguous to the steering wheel rim. The support knitted by stitch row or by single stitch is so elastic that it is even laid onto the spokes, without creases being formed.

It is expedient that the heating resistor be knitted by stitch row or by single stitch as a thread into the textile support. The elasticity of the textile support is not impaired by the inelastic heating resistor if this type of fastening is adopted. At the same time, the heating resistor is expediently knitted in, so that the heating resistor is masked by the material of the textile support to a lesser extent on one side than on the other side. The heating element is laid with the side masked to the greater extent onto a base, for example onto the steering wheel, while the other side forms the top side having the essentially exposed heating resistor.

Preferably, a plurality of threadlike heating resistors are arranged next to one another, and can in particular, follow a meandering course. At the same time, the heating resistors may both lie at a distance from one another at which they do not intermesh and be arranged so as to be nested one in the other, without touching one another. The degree of heating can be influenced by arranging the heating resistors with differing density in this way.

In a preferred embodiment, the textile support is designed as a plane band, at the two ends of which the heating resistor ends are connected, in each case via a connection piece, to the commercially available junction leads of the vehicle. In order to avoid a buildup of heat at the connection pieces, it is expedient for connection pieces to be connected to the individual heating resistors at the two ends of the textile support over the entire width of the latter.

The textile support may have any desired selected length, so that, for example, a steering wheel rim is masked by the heating element completely or only on selected portions.

Although the heat is radiated to the top side to a greater extent as a result of the essential masking of the heating resistors on the underside of the textile support, this effect may be reinforced even further if the textile support is provided on the underside with a reflection layer.

The heating element according to the invention can be used in a simple way for heating different parts in the motor vehicle. A heating element which masks the entire steering wheel rim may be arranged on the steering wheel. However, a plurality of shorter heating elements may also be provided, which mask only specific regions of the steering wheel rim, for example the East/West segments on a steering wheel which has to be operated only through 180° to left or right due to the use of an electronic control. Heating is then required only in these segments.

BRIEF DESCRIPTION OF THE DRAWINGS

The invention will be explained in an exemplary embodiment with reference to drawings in which.

DETAILED DESCRIPTION

Figure 1:
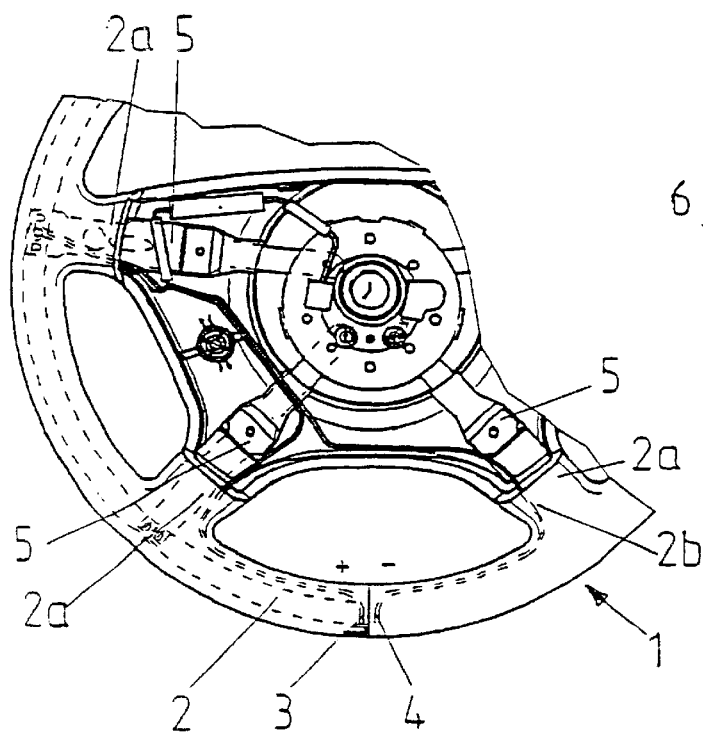
FIG. 1 shows a top view of a portion of a steering wheel.

A heating element 2 with junction leads 3, 4 is arranged in the cover of a steering wheel rim 1. The heating element 2 has, in the region of the spokes 5 of the steering wheel, protuberances 2*a* which can be laid around the spoke junctions 2*b* to the steering wheel rim, so that even the region of the spokes 5 which adjoins the steering wheel rim can be heated. Since, according to the invention, the textile support 6 of the heating element 2 is knitted by stitch row or by single stitch, said heating element can be laid ceaselessly both around the steering wheel rim 1 and around the spokes 5.

Figure 2:
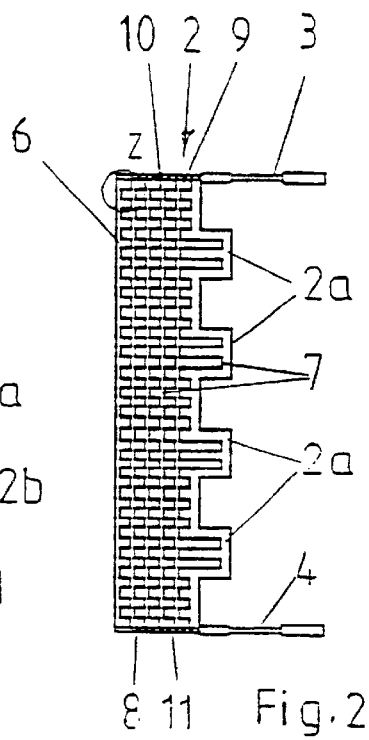
FIG. 2 shows a top view of a heating element.

FIG. 2 shows the heating element 2 in the spread-out position. Heating resistors 7, which extend between the ends 8, 9 of the textile support 6, are knitted into said textile support 6. The heating resistors follow a meandering course, adjacent heating resistors being arranged at a distance from one another, so that they have no electrical contact. Electrical contact is made only at the ends of the textile support via connection pieces 10, 11. These extend over the entire width of the textile support, so that the ends of the heating resistors are connected separately from one another to the connection pieces. This avoids a buildup of heat at the connection pieces. The connection pieces 10, 11 are connected to the junction leads 3 and 4 respectively.

Figure 3:
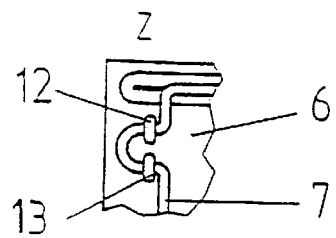
FIG. 3 shows the detail Z of FIG. 2.
Figure 4:
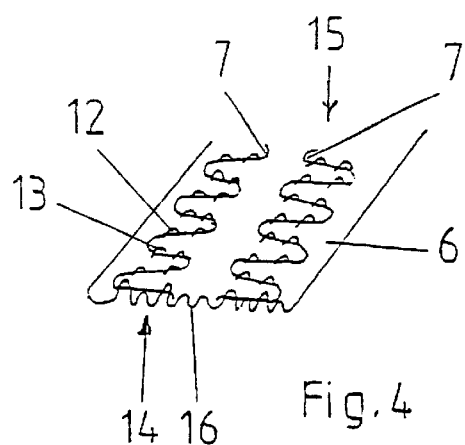
FIG. 4 shows a partially sectional perspective view of a heating element.

FIG. 3 illustrates, in the form of a detail, how an individual heating resistor is connected to the textile support by means of stitches 12, 13 of the latter. FIG. 4 shows, in the form of a larger detail, the textile support 6 with two heating resistors 7. The textile support has an underside 14 which rests on the steering wheel rim 1 and on the spoke junctions 2*b* to the steering wheel rim, while the top side 15 is surrounded by the steering wheel cover 21. It can be seen that the heating resistors on the top side are not surrounded by every stitch of the textile support. The heating resistors are essentially exposed there, so that the heat can be radiated upward. By contrast, a denser stitchwork 16 extends on the underside 14, so that less heat is radiated thereto. Unnecessary heating of the steering wheel skeleton is consequently prevented.

Figure 5:
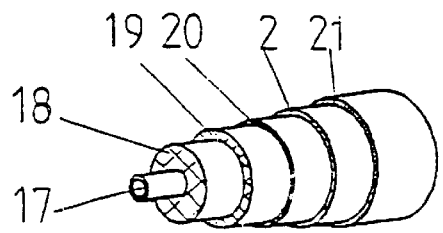
FIG. 5 shows a partially sectional perspective view of a portion of the steering wheel rim.

The construction of the steering wheel rim 1 can be seen from FIG. 5. This consists, in a known way, of a steering wheel skeleton 17 with a plastic cover 18. The latter is surrounded, in the embodiment illustrated, by a layer of rubber 19 lacquered in a silver color or by a reflection foil 20. These two layers are intended to reduce to an even greater extent the heat radiation of the heating element 2 which rests on the reflection foil 20. The heating element 2 is surrounded by the leather cover 21 which forms the surface of the steering wheel.

What is claimed is:

1. A heating element for a graspable part of a motor vehicle, in particular for a steering wheel, the heating element comprising a textile support with at least one heating resistor, wherein the textile support is knitted by stitch row or by single stitch, the heating resistor is knitted by stitch row or by single stitch as a thread into the textile support, and wherein the heating resistor is knitted in, in such a way that the heating resistor is masked by the material of the textile support to a lesser extent on one side than on the other side.

2. A heating element according to claim 1, wherein the at least one heating resistor includes a plurality of threadlike heating resistors are arranged next to one another.

3. A heating element according to claim 1, wherein the at least one heating element includes a plurality of threadlike heating resistors, and wherein the threadlike heating resistors follow a meandering course.

4. A heating element according to claim 3, wherein the at least one heating element includes a plurality of threadlike heating resistors, and wherein the threadlike heating resistors are arranged so as to be nested one in the other, without touching one another.

5. A heating element according to claim 1, wherein the textile support is a plane band having two ends which are connected via connection pieces, to junction leads of the vehicle.

6. A heating element according to claim 5, wherein the at least one heating element comprises a plurality of individual heating resistors, and wherein connection pieces are connected to the plurality of individual heating resistors at the two ends of the textile support over the entire width of the textile support.

7. A heating element according to claim 1, wherein the textile support has an underside and is provided with a reflection layer on the underside.

8. A steering wheel comprising:

a steering wheel rim;

spokes adjoining the steering wheel rim; and a heating element comprising a textile support with at least one heating resistor, wherein the textile support is knitted by stitch row or by single stitch, the heating resistor is knitted by stitch row or by single stitch as a thread into the textile support, and wherein the heating resistor is knitted in, in such a way that the heating resistor is masked by the material of the textile support to a lesser extent on one side than on the other side.

9. A steering wheel according to claim 8, wherein the textile support masks the steering wheel rim and adjoining regions of the spokes.

10. A steering wheel according to claim 8, wherein a plurality of threadlike heating resistors are arranged next to one another.

11. A heating element according to claim 8, wherein the textile support has an underside positioned adjacent to the steering wheel rim and wherein the underside is provided with a reflection layer on the underside.

* * * * *